United States Patent
Tajiri

(10) Patent No.: US 8,979,292 B2
(45) Date of Patent: Mar. 17, 2015

(54) DISPLAY, TELEVISION SET, AND LIQUID CRYSTAL TELEVISION SET

(75) Inventor: Tomohisa Tajiri, Daito (JP)

(73) Assignee: Funai Electric Co., Ltd., Daito-shi (JP)

(*) Notice: Subject to any disclaimer, the term of this patent is extended or adjusted under 35 U.S.C. 154(b) by 244 days.

(21) Appl. No.: 13/462,451

(22) Filed: May 2, 2012

(65) Prior Publication Data

US 2012/0287353 A1 Nov. 15, 2012

(30) Foreign Application Priority Data

May 10, 2011 (JP) ................................. 2011-104975

(51) Int. Cl.
*F21V 8/00* (2006.01)
*G02F 1/1335* (2006.01)

(52) U.S. Cl.
CPC ............ *G02B 6/0016* (2013.01); *G02B 6/0068* (2013.01); *G02B 6/0073* (2013.01)
USPC ......... 362/97.2; 362/97.1; 362/608; 362/610; 362/297; 362/339; 349/65

(58) Field of Classification Search
CPC .................... G02F 1/133611; G02F 1/133615; G02B 6/00; G02B 6/003; G02B 5/02; G02B 6/0011–6/0075; F21V 5/02; F21V 7/0091; F21V 7/041
USPC .......................... 362/606, 608, 610–613, 97.2
See application file for complete search history.

(56) References Cited

U.S. PATENT DOCUMENTS

| | | | |
|---|---|---|---|
| 6,805,468 B2* | 10/2004 | Itoh et al. ...................... | 362/362 |
| 7,072,116 B2 | 7/2006 | Okuwaki et al. | |
| 7,101,070 B2* | 9/2006 | Yu et al. ......................... | 362/558 |
| 7,206,491 B2 | 4/2007 | Feng et al. ..................... | 385/146 |
| 7,525,531 B2* | 4/2009 | Ogiwara et al. ............... | 345/103 |
| 7,918,597 B2* | 4/2011 | Kunimochi .................... | 362/608 |
| 2005/0243551 A1* | 11/2005 | Onishi et al. .................. | 362/244 |
| 2007/0121342 A1* | 5/2007 | Tamura et al. ................ | 362/608 |
| 2007/0263407 A1 | 11/2007 | Sakai | |
| 2008/0043170 A1* | 2/2008 | Ikeda ............................. | 349/65 |
| 2010/0014022 A1 | 1/2010 | Nagata et al. | |
| 2013/0063682 A1* | 3/2013 | Chen et al. .................... | 349/65 |

FOREIGN PATENT DOCUMENTS

JP 11-203923 A 7/1999
(Continued)

OTHER PUBLICATIONS

The Extended European Search Report dated Sep. 5, 2012 (Six (6) pages).

*Primary Examiner* — Sikha Roy

(74) *Attorney, Agent, or Firm* — Crowell & Moring LLP

(57) ABSTRACT

This display includes point light sources, a light guide plate including a light-receiving surface on which light emitted from the point light sources is directly incident, opposed to the point light sources, and a display cell provided on a surface of the light guide plate, while a plurality of projecting portions each having a width smaller than a width of each of the point light sources in an extensional direction of a side of the light guide plate provided with the light-receiving surface are provided on a region of the light-receiving surface of the light guide plate opposed to the point light sources, and the plurality of projecting portions of the light guide plate are formed to have irregularly different shapes.

20 Claims, 8 Drawing Sheets

(56) References Cited

FOREIGN PATENT DOCUMENTS

| JP | 11-231320 A | 8/1999 |
| JP | 2002-196151 A | 7/2002 |
| JP | 2006-49192 A | 2/2006 |
| JP | 2007-188645 A | 7/2007 |
| JP | 2009-54454 A | 3/2009 |
| KR | 2008-0112846 A | 12/2008 |

* cited by examiner

FIG.2    500-500 CROSS-SECTION

DISPLAY, TELEVISION SET, AND LIQUID CRYSTAL TELEVISION SET

BACKGROUND OF THE INVENTION

1. Field of the Invention

The present invention relates to a display, a television set, and a liquid crystal television set, and more particularly, it relates to a display, a television set, and a liquid crystal television set each including a light source and a light guide plate.

2. Description of the Background Art

A display including a light source and a light guide plate is known in general, as disclosed in Japanese Patent Laying-Open No. 11-231320 (1999), for example.

Japanese Patent Laying-Open No. 11-231320 discloses a liquid crystal display (display) including a bar-shaped member including a point light source, a light guide plate having a light-receiving surface provided to be opposed to the bar-shaped member, and a liquid crystal display panel. In this display, a plurality of triangular projecting portions having the same shapes and angles are formed along the light-receiving surface of the light guide plate. Light emitted from the point light source is incident while the same is inclined with respect to the light-receiving surface by the bar-shaped member, and the light is bent at a prescribed angle by the triangular projecting portions of the light-receiving surface and travels toward a surface opposite to the light-receiving surface in the light guide plate.

Furthermore, an arrangement in which light is incident directly from a light source (a plurality of point light sources) onto a light-receiving surface of a light guide plate without using a bar-shaped member or the like is also known in general. In this case, the plurality of point light sources are arranged to be opposed to the light-receiving surface of the light guide plate. If such a conventional arrangement is applied to the display described in Japanese Patent Laying-Open No. 11-231320, a plurality of point light sources are provided to be opposed to the light-receiving surface of the light guide plate, and light is incident directly from the point light sources onto the projecting portions of the light-receiving surface having the same shapes and angles.

If the plurality of point light sources are so opposed to the light-receiving surface of the light guide plate that the light is incident directly from the point light sources onto the projecting portions of the light-receiving surface having the same shapes and angles as in the conventional arrangement described in Japanese Patent Laying-Open No. 11-231320, however, the light is refracted in a regular and constant direction by the projecting portions having the same shapes, and spread in the light guide plate. In this case, a larger amount of light is incident from the point light sources onto positions of the light-receiving surface (projecting portions) opposed to the point light sources while a smaller amount of light is incident from the point light sources onto positions of the light-receiving surface (projecting portions) corresponding to positions between the adjacent point light sources, so that bright regions where a larger amount of light reaches and dark regions where a smaller amount of light reaches are formed in the vicinity of the light-receiving surface of the light guide plate. Consequently, the bright and dark regions are formed in the light guide plate so that the luminance of light emitted from the light guide plate is uneven. Thus, the display quality of the display is disadvantageously reduced.

SUMMARY OF THE INVENTION

The present invention has been proposed in order to solve the aforementioned problem, and an object of the present invention is to provide a display, a television set, and a liquid crystal television set each capable of suppressing a reduction in display quality even if light is incident directly from point light sources onto a light guide plate.

A display according to a first aspect of the present invention includes point light sources, a light guide plate including a light-receiving surface on which light emitted from the point light sources is directly incident, opposed to the point light sources, and a display cell provided on a surface of the light guide plate, while a plurality of projecting portions each having a width smaller than a width of each of the point light sources in an extensional direction of a side of the light guide plate provided with the light-receiving surface are provided on a region of the light-receiving surface of the light guide plate opposed to the point light sources, and the plurality of projecting portions of the light guide plate are formed to have irregularly different shapes.

In the display according to the first aspect of the present invention, as hereinabove described, the plurality of projecting portions each having the width smaller than the width of each of the point light sources in the extensional direction of the side of the light guide plate provided with the light-receiving surface are provided on the region of the light-receiving surface of the light guide plate opposed to the point light sources while the plurality of projecting portions of the light guide plate are formed to have the irregularly different shapes, whereby the light emitted from the point light sources is directly incident on the plurality of projecting portions each having the width smaller than the width of each of the point light sources and having the irregularly different shapes. Thus, the light can be irregularly refracted by the plurality of projecting portions having the irregularly different shapes to be spread in the light guide plate, and hence formation of bright and dark regions in the light guide plate can be suppressed. Consequently, unevenness of the amount of light emitted from the light guide plate can be suppressed, and hence a reduction in display quality can be suppressed even if the light is incident directly from the point light sources onto the light guide plate.

In the aforementioned display according to the first aspect, the light-receiving surface provided with the plurality of projecting portions having the irregularly different shapes is preferably so formed that the light incident on the light-receiving surface is refracted at different angles depending on incident positions of the light on the light-receiving surface. According to this structure, the light can be refracted at the different angles depending on the positions of the light-receiving surface on which the light is incident, and hence the light can be irregularly spread in the light guide plate. Thus, formation of bright and dark regions in the light guide plate can be effectively suppressed, and a reduction in display quality can be suppressed.

In this case, the plurality of projecting portions are preferably formed to have irregularly different projecting heights. According to this structure, the sizes of the projecting portions are irregular so that the light emitted from the point light sources toward the light-receiving surface can be incident through surfaces of the projecting portions of the light guide plate having the irregular sizes. Thus, the light can easily reach regions that the light in the light guide plate hardly reaches, opposed to positions between the adjacent point light sources. Consequently, formation of bright and dark regions in the light guide plate can be effectively suppressed, and hence a reduction in the display quality of the display can be suppressed.

In the aforementioned structure in which the light-receiving surface refracts the light at the different angles depending on the incident positions of the light on the light-receiving surface, the plurality of projecting portions are preferably formed to have irregularly different widths. According to this structure, the sizes of the projecting portions are irregular so that the light emitted from the point light sources toward the light-receiving surface can be incident through the surfaces of the projecting portions of the light guide plate having the irregular sizes. Thus, the light can easily reach the regions that the light in the light guide plate hardly reaches, opposed to the positions between the adjacent point light sources. Consequently, formation of bright and dark regions in the light guide plate can be effectively suppressed, and hence a reduction in the display quality of the display can be suppressed.

In the aforementioned display according to the first aspect, a projecting height of each of the plurality of projecting portions is preferably smaller than the width of each of the point light sources in the extensional direction of the side of the light guide plate provided with the light-receiving surface. According to this structure, a distance between the light guide plate and the point light sources can be reduced, and hence an increase in the size of the display can be suppressed while unevenness of the amount of light emitted from the light guide plate can be suppressed.

In the aforementioned structure in which the plurality of projecting portions are formed to refract the light incident on the light-receiving surface at the different angles depending on the incident positions of the light on the light-receiving surface, the plurality of projecting portions are preferably formed in tapered shapes having apex portions with irregularly different angles. According to this structure, the light can be refracted at the different angles on the projecting portions on which the light is incident, and hence the incident light can be easily refracted at the different angles depending on the incident positions of the light on the projecting portions.

In the aforementioned structure in which the plurality of projecting portions are formed to refract the light incident on the light-receiving surface at the different angles depending on the incident positions of the light on the light-receiving surface, the plurality of projecting portions are preferably formed in arcuate shapes having apex portions with irregularly different projecting heights. According to this structure, the light can be irregularly refracted at the different angles on an entire region of the projecting portions in the arcuate shapes having the apex portions with the irregularly different projecting heights. Thus, the incident light can be easily refracted at the different angles depending on the incident positions of the light on the projecting portions while the light can be effectively spread irregularly in the light guide plate.

In the aforementioned structure in which the plurality of projecting portions are formed to refract the light incident on the light-receiving surface at the different angles depending on the incident positions of the light on the light-receiving surface, the plurality of projecting portions are preferably formed to have surfaces in irregularly changing curved shapes. According to this structure, the incident light can be easily refracted at the different angles depending on the incident positions of the light on the projecting portions simply by forming the light-receiving surface of the light guide plate in the irregularly curved shapes.

In the aforementioned structure in which the projecting portions are formed in the tapered shapes, the light guide plate preferably includes a flat portion substantially parallel to the point light sources opposed to the light guide plate, each of the plurality of projecting portions preferably includes a first inclined surface and a second inclined surface both extending in a thickness direction of the light guide plate, and the first inclined surface and the second inclined surface are preferably inclined in directions opposite to each other with respect to the flat portion. According to this structure, the first inclined surface and the second inclined surface can refract the light in the directions opposite to each other, and hence the light can be effectively dispersed.

In the aforementioned structure in which the projecting portions are formed in the tapered shapes, the plurality of projecting portions are preferably so formed that the apex portions have angles substantially equal to each other. According to this structure, the structure of the plurality of projecting portions can be inhibited from complication while the light can be refracted at the different angles.

In the aforementioned structure in which the light-receiving surface refracts the light at the different angles depending on the incident positions of the light on the light-receiving surface, the plurality of projecting portions are preferably provided over a substantially entire region of the light-receiving surface in the extensional direction of the side of the light guide plate provided with the light-receiving surface. According to this structure, unevenness of the amount of light emitted from the light guide plate over an entire region of the light guide plate in the extensional direction of the side of the light guide plate provided with the light-receiving surface can be suppressed.

In the aforementioned display according to the first aspect, the light-receiving surface of the light guide plate preferably includes a plurality of flat portions having different lengths in a direction along the light-receiving surface, provided between the plurality of projecting portions. According to this structure, the amount of light going straight in the light guide plate from the flat portions can be irregularized by the plurality of flat portions having the different lengths in the direction along the light-receiving surface when part of light incident on the plurality of flat portions goes straight toward a surface of the light guide plate opposite to the light-receiving surface in the light guide plate. Thus, the light can be more effectively spread irregularly in the light guide plate by the plurality of flat portions having the different lengths in the direction along the light-receiving surface and the plurality of projecting portions having the irregular shapes. Consequently, unevenness of the amount of light emitted from the light guide plate can be further suppressed.

In this case, each of the plurality of projecting portions preferably has a width larger than a width of each of the plurality of flat portions in the extensional direction of the side of the light guide plate provided with the light-receiving surface. According to this structure, the plurality of projecting portions can be provided in a wider range, and hence the light can be effectively spread evenly over the entire region of the light guide plate in the extensional direction of the side of the light guide plate provided with the light-receiving surface.

In the aforementioned structure including the plurality of flat portions having the different lengths, the flat portions are preferably provided on all positions between the adjacent projecting portions. According to this structure, the flat portions and the projecting portions can be alternately provided along the side of the light guide plate provided with the light-receiving surface, and hence the light can be more evenly spread over the entire region of the light guide plate in the extensional direction of the side of the light guide plate provided with the light-receiving surface.

In the aforementioned display according to the first aspect, each of the plurality of projecting portions preferably has a width not more than $1/5$ of the width of each of the point light sources in the extensional direction of the side of the light guide plate provided with the light-receiving surface. According to this structure, the more numerous projecting portions having the irregular shapes can be arranged to be opposed to the point light sources, and hence the incident light can be easily spread irregularly in the light guide plate. Thus, formation of bright and dark regions in the light guide plate can be effectively suppressed, and hence a reduction in the display quality of the display can be suppressed.

A television set according to a second aspect of the present invention includes point light sources, a light guide plate including a light-receiving surface on which light emitted from the point light sources is directly incident, opposed to the point light sources, a display cell provided on a surface of the light guide plate, and a receiving portion receiving television broadcasting, while a plurality of projecting portions each having a width smaller than a width of each of the point light sources in an extensional direction of a side of the light guide plate provided with the light-receiving surface are provided on a region of the light-receiving surface of the light guide plate opposed to the point light sources, and the plurality of projecting portions of the light guide plate are formed to have irregularly different shapes.

In the television set according to the second aspect of the present invention, as hereinabove described, the plurality of projecting portions each having the width smaller than the width of each of the point light sources in the extensional direction of the side of the light guide plate provided with the light-receiving surface are provided on the region of the light-receiving surface of the light guide plate opposed to the point light sources while the plurality of projecting portions of the light guide plate are formed to have the irregularly different shapes, whereby the light emitted from the point light sources is directly incident on the plurality of projecting portions each having the width smaller than the width of each of the point light sources and having the irregularly different shapes. Thus, the light can be irregularly refracted by the plurality of projecting portions having the irregularly different shapes to be spread in the light guide plate, and hence formation of bright and dark regions in the light guide plate can be suppressed. Consequently, unevenness of the amount of light emitted from the light guide plate can be suppressed, and hence a reduction in the display quality of the television set can be suppressed even if the light is incident directly from the point light sources onto the light guide plate.

In the aforementioned television set according to the second aspect, the light-receiving surface provided with the plurality of projecting portions having the irregularly different shapes is preferably so formed that the light incident on the light-receiving surface is refracted at different angles depending on incident positions of the light on the light-receiving surface. According to this structure, the light can be refracted at the different angles depending on the positions of the light-receiving surface on which the light is incident, and hence the light can be irregularly spread in the light guide plate. Thus, formation of bright and dark regions in the light guide plate can be effectively suppressed, and a reduction in display quality can be suppressed.

In this case, the plurality of projecting portions are preferably formed to have irregularly different projecting heights. According to this structure, the sizes of the projecting portions are irregular so that the light emitted from the point light sources toward the light-receiving surface can be incident through surfaces of the projecting portions of the light guide plate having the irregular sizes. Thus, the light can easily reach regions that the light in the light guide plate hardly reaches, opposed to positions between the adjacent point light sources. Consequently, formation of bright and dark regions in the light guide plate can be effectively suppressed, and hence a reduction in the display quality of the television set can be suppressed.

In the aforementioned structure in which the light-receiving surface refracts the light at the different angles depending on the incident positions of the light on the light-receiving surface, the plurality of projecting portions are preferably formed to have irregularly different widths. According to this structure, the sizes of the projecting portions are irregular so that the light emitted from the point light sources toward the light-receiving surface can be incident through the surfaces of the projecting portions of the light guide plate having the irregular sizes. Thus, the light can easily reach the regions that the light in the light guide plate hardly reaches, opposed to the positions between the adjacent point light sources. Consequently, formation of bright and dark regions in the light guide plate can be effectively suppressed, and hence a reduction in the display quality of the television set can be suppressed.

A liquid crystal television set according to a third aspect of the present invention includes point light sources, a light guide plate including a light-receiving surface on which light emitted from the point light sources is directly incident, opposed to the point light sources, a liquid crystal cell provided on a surface of the light guide plate, and a receiving portion receiving television broadcasting, while a plurality of projecting portions each having a width smaller than a width of each of the point light sources in an extensional direction of a side of the light guide plate provided with the light-receiving surface are provided on a region of the light-receiving surface of the light guide plate opposed to the point light sources, and the plurality of projecting portions of the light guide plate are formed to have irregularly different shapes.

In the liquid crystal television set according to the third aspect of the present invention, as hereinabove described, the plurality of projecting portions each having the width smaller than the width of each of the point light sources in the extensional direction of the side of the light guide plate provided with the light-receiving surface are provided on the region of the light-receiving surface of the light guide plate opposed to the point light sources while the plurality of projecting portions of the light guide plate are formed to have the irregularly different shapes, whereby the light emitted from the point light sources is directly incident on the plurality of projecting portions each having the width smaller than the width of each of the point light sources and having the irregularly different shapes. Thus, the light can be irregularly refracted by the plurality of projecting portions having the irregularly different shapes to be spread in the light guide plate, and hence formation of bright and dark regions in the light guide plate can be suppressed. Consequently, unevenness of the amount of light emitted from the light guide plate can be suppressed, and hence a reduction in the display quality of the liquid crystal television set can be suppressed even if the light is incident directly from the point light sources onto the light guide plate.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

The structure of a liquid crystal television set 300 according to a first embodiment of the present invention is now described with reference to FIGS. 1 to 5. The liquid crystal television set 300 is an example of the "display" or the "television set" in the present invention.

Figure 1:
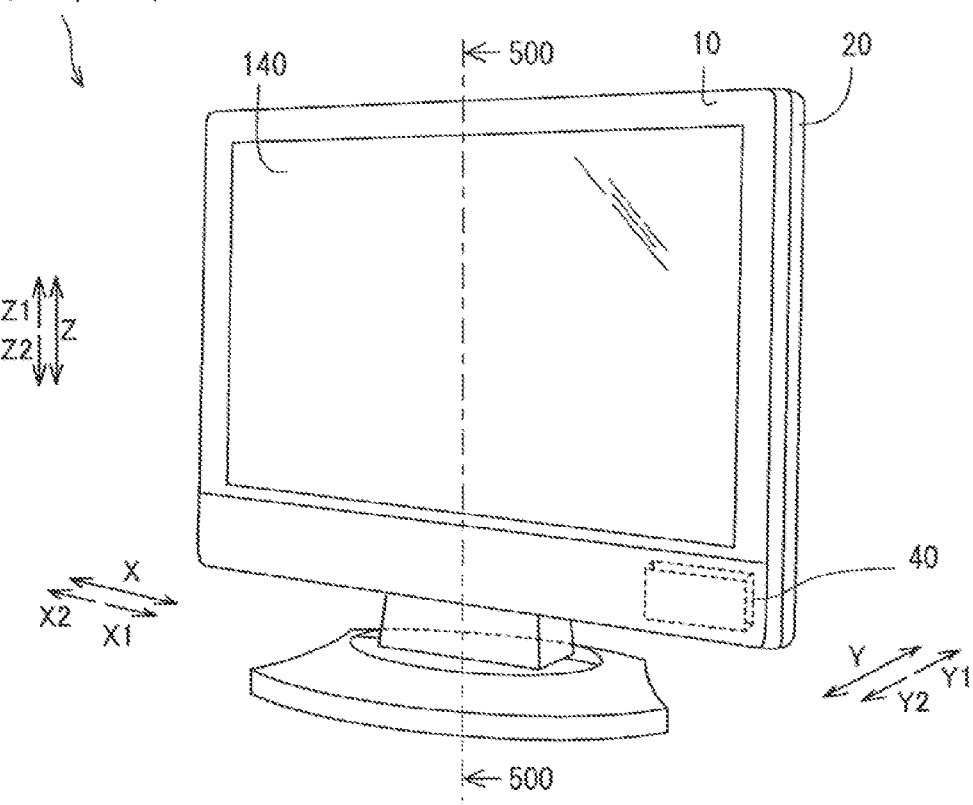
FIG. 1 is a perspective view showing the overall structure of a liquid crystal television set according to a first embodiment of the present invention.
Figure 2:
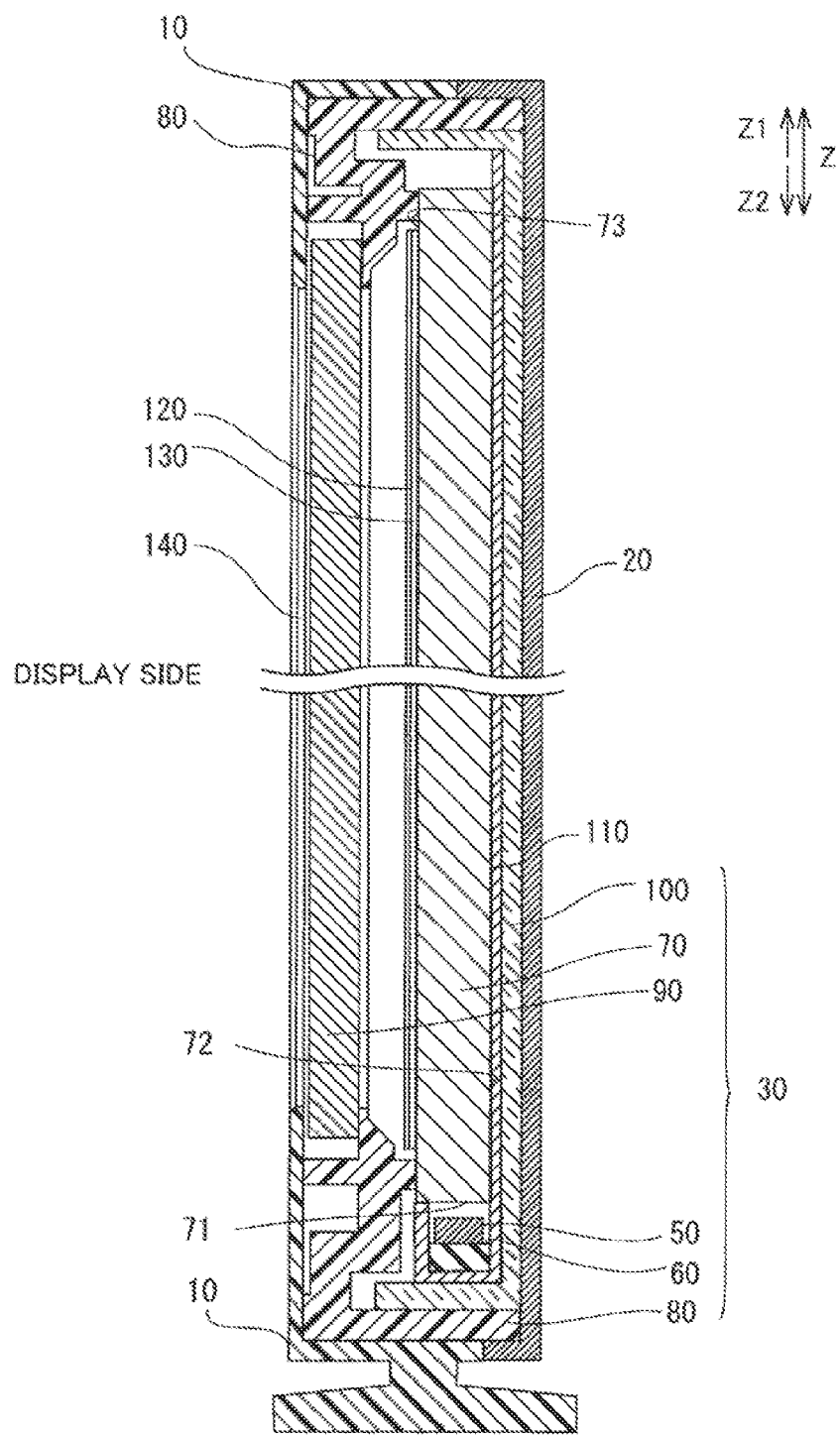
FIG. 2 is a sectional view taken along the line 500-500 of the liquid crystal television set shown in FIG. 1.

The liquid crystal television set 300 according to the first embodiment includes a front cabinet 10, a rear cabinet 20, a liquid crystal module 30, and a tuner 40, as shown in FIGS. 1 and 2. The liquid crystal module 30 includes a plurality of LEDs 50, an LED substrate 60, a light guide plate 70, a mold frame 80, and a liquid crystal cell 90. The LEDs 50 are examples of the "point light sources" in the present invention, and the tuner 40 is an example of the "receiving portion" in the present invention. The liquid crystal cell 90 is an example of the "display cell" in the present invention.

The front cabinet 10 is arranged on the front side (along arrow Y2) of the liquid crystal television set 300. The front cabinet 10 engages with the mold frame 80 of the liquid crystal module 30 from the front side of the liquid crystal television set 300.

The rear cabinet 20 is arranged on the rear side (along arrow Y1) of the liquid crystal television set 300. The rear cabinet 20 engages with the mold frame 80 of the liquid crystal module 30 from the rear side of the liquid crystal television set 300.

The tuner 40 is stored in a space surrounded by the front cabinet 10 and the rear cabinet 20.

The liquid crystal module 30 includes the LEDs 50, the LED substrate 60 and the light guide plate 70 on the rear side (along arrow Y1) of the mold frame 80, and the liquid crystal cell 90 on the front side (along arrow Y2) of the mold frame 80. The liquid crystal module 30 is fixed to a rear frame 100 by the mold frame 80. The liquid crystal module 30 fixed to the rear frame 100 is stored in a space surrounded by the front cabinet 10 and the rear cabinet 20.

Figure 3:
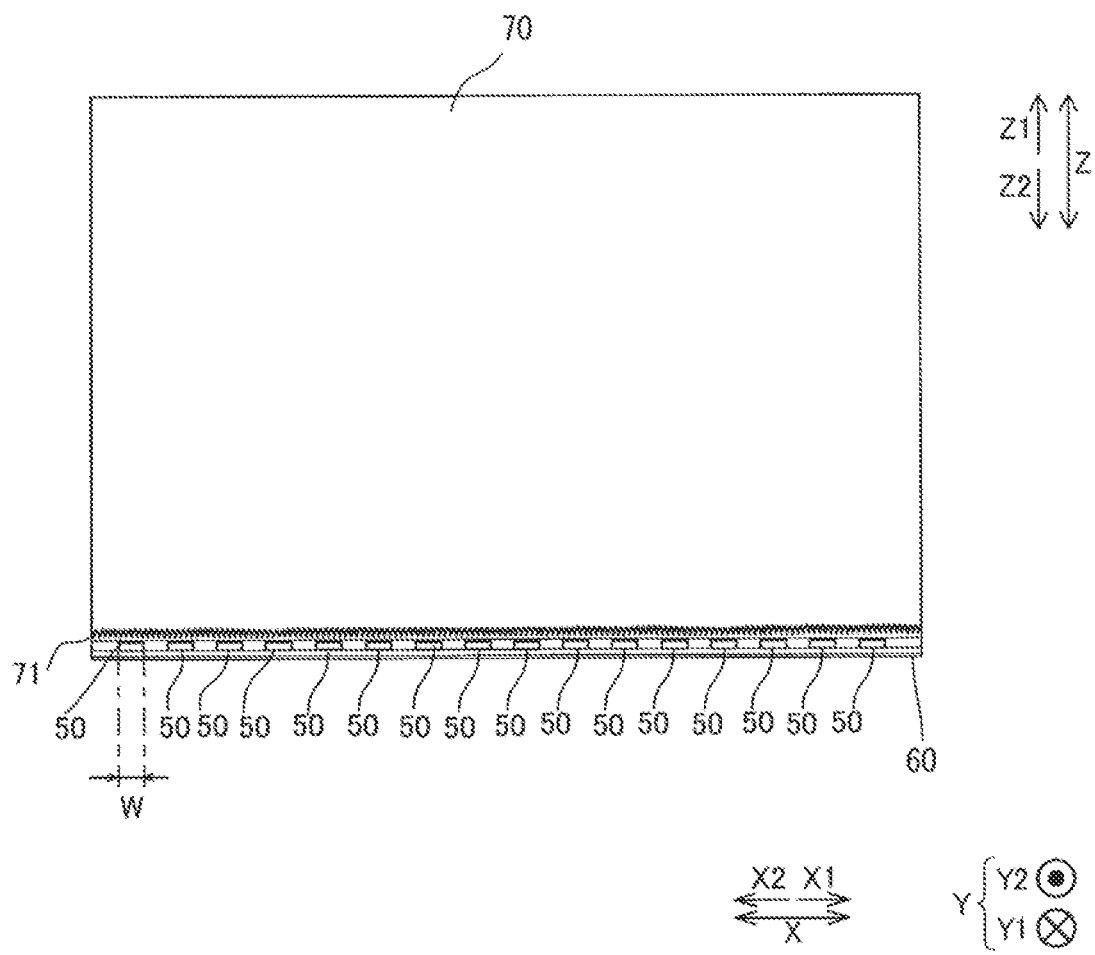
FIG. 3 is a front elevational view showing the structure of LEDs and a light guide plate of the liquid crystal television set shown in FIG. 1.

The plurality of LEDs 50 are arranged on the LED substrate 60 along a direction X, as shown in FIG. 3. These LEDs 50 and LED substrate 60 are so arranged in the vicinity of a lower portion (along arrow Z2) of the light guide plate 70 as to be substantially parallel to a light-receiving surface 71 of the light guide plate 70 and opposed to the light-receiving surface 71 at a short distance. Each of the plurality of LEDs 50 has a width W in a longitudinal direction (direction X). The LEDs 50 emit light to the light-receiving surface 71 of the light guide plate 70.

Figure 4:
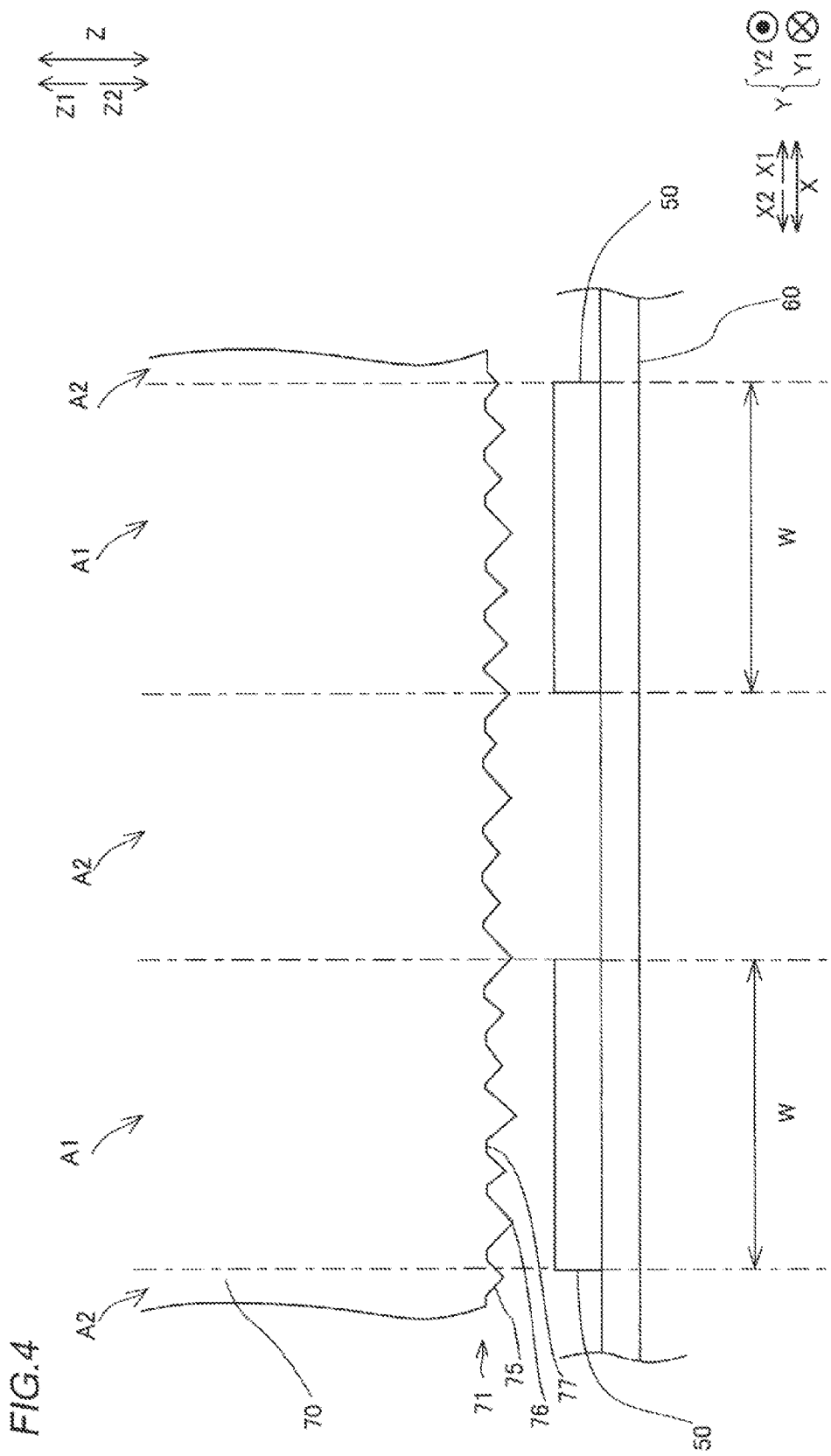
FIG. 4 is an enlarged front elevational view of the LEDs and the light guide plate shown in FIG. 3.

According to the first embodiment, the light guide plate 70 is schematically in the form of a substantially rectangular flat plate, as shown in FIGS. 2 and 3. The light guide plate 70 includes the light-receiving surface 71 on which the light emitted from the LEDs 50 is incident, a bottom surface 72, and a surface 73 constituting a light-emitting surface. A plurality of projecting portions 75 are formed along the direction X on the light-receiving surface 71. The plurality of projecting portions 75 are provided over a substantially entire region of the light-receiving surface 71 in an extensional direction (direction X) of a side of the light guide plate 70 provided with the light-receiving surface 71. The plurality of projecting portions 75 are formed to project toward the LEDs 50 (along arrow Z2) from the light-receiving surface 71, as shown in FIG. 4. The light entering the light guide plate 70 through the light-receiving surface 71 travels along arrow Z1 inside the light guide plate 70 while repeating total reflection inside the light guide plate 70. The light travelling inside the light guide plate 70 is reflected by a reflective portion (not shown) arranged on the bottom surface 72 of the light guide plate 70, and emitted from the surface 73 of the light guide plate 70 by varying an angle of incidence with respect to the surface 73.

Figure 5:
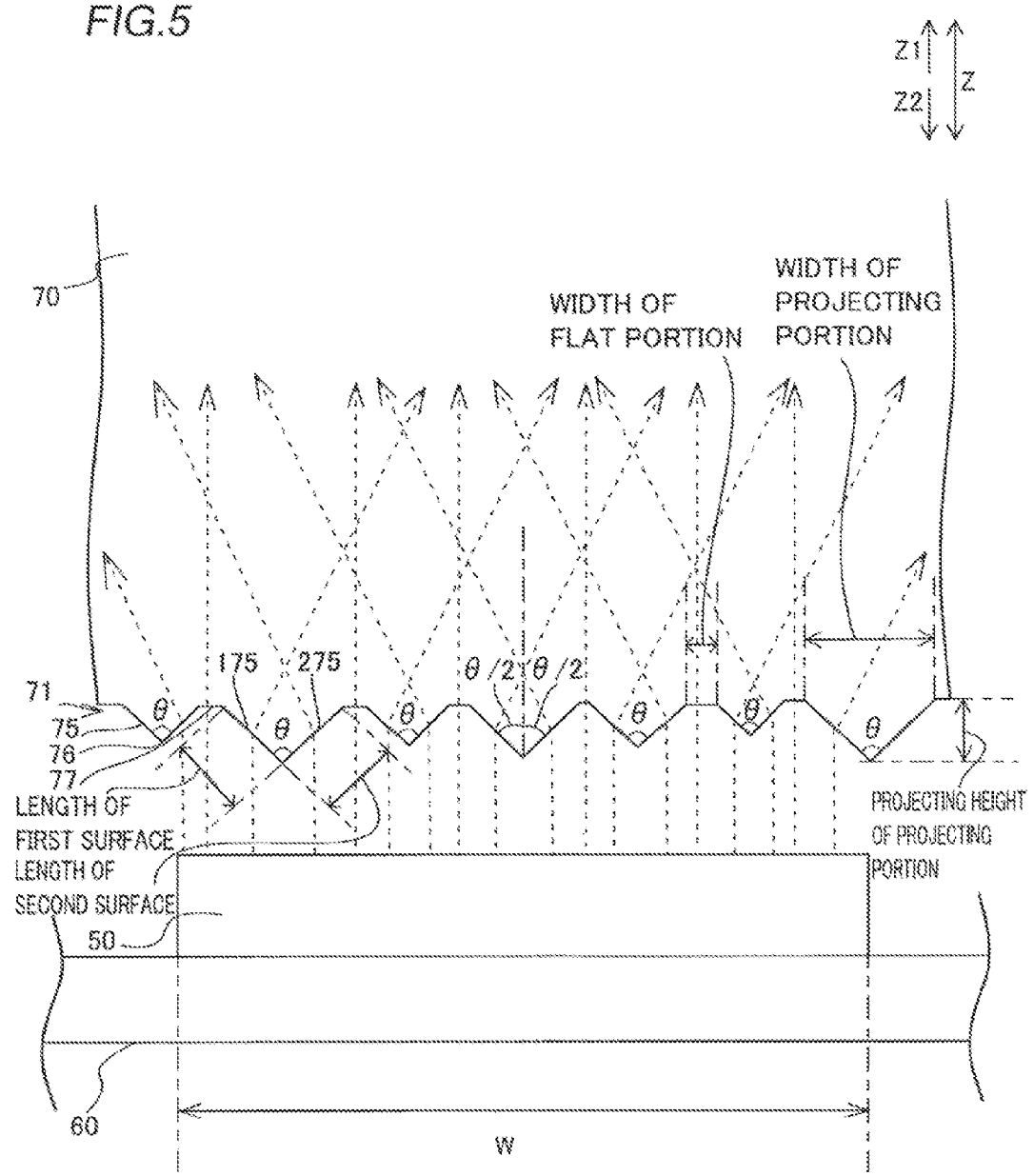
FIG. 5 is a front elevational view showing a path of light refracted in a region, in the vicinity of a light-receiving surface, of the light guide plate shown in FIG. 3.

As shown in FIG. 5, the plurality of projecting portions 75 each have a substantially triangular shape, and are integrally formed on the light guide plate 70. Each of the projecting portions 75 has a first surface 175 and a second surface 275. The first surface 175 and the second surface 275 have substantially the same lengths as viewed along arrow Y1. The plurality of projecting portions 75 have irregularly different projecting heights. Each of the projecting heights of the plurality of projecting portions 75 is smaller than the width W of each of the LEDs 50 in the extensional direction (direction X) of the side of the light guide plate 70 provided with the light-receiving surface 71. Furthermore, the plurality of projecting portions 75 have irregularly different widths in the extensional direction (direction X) of the side of the light guide plate 70 provided with the light-receiving surface 71 and each not more than 1/5 of the width W of each of the LEDs 50. The apex portions 76 of the plurality of projecting portions 75 have the same angles θ. In other words, the plurality of projecting portions 75 are formed in isosceles triangular shapes having the apex portions 76 with the common angles θ and irregularly different sizes (projecting heights and widths), as viewed along arrow Y1. Flat portions 77 are formed substantially parallel to the LEDs 50 arranged to be opposed to the light guide plate 70 between the adjacent projecting portions 75. The flat portions 77 have irregularly different widths and each smaller than the width of each of the projecting portions 75. The first surface 175 is an example of the "first inclined surface" in the present invention. The second surface 275 is an example of the "second inclined surface" in the present invention.

The light emitted from the LEDs 50 toward the light-receiving surface 71 goes straight to the light-receiving surface 71, and enters the light guide plate 70 through the projecting portions 75 and the flat portions 77. The first surface 175 and the second surface 275 of each of the projecting portions 75 each are inclined substantially by an angle θ/2 with respect to a direction Z. The first surface 175 and the second surface 275 of each of the projecting portions 75 are inclined in directions opposite to each other with respect to the flat portions 77. Consequently, the light emitted from the LEDs 50 into the projecting portions 75 is refracted by the projecting portions 75, and travels in a direction inclined with respect to a direction along arrow Z1 (travelling direction of the light from the LEDs 50 toward the light-receiving surface 71) inside the light guide plate 70. On the other hand, the light emitted from the LEDs 50 is hardly refracted by the flat portions 77 of the light guide plate 70 thereby entering the light guide plate 70 at an angle substantially perpendicular to the flat portions 77. In other words, the projecting portions 75 and the flat portions 77 provided on the light-receiving surface 71 refract the light incident on the light-receiving surface 71 at different angles.

As shown in FIG. 2, the liquid crystal module 30 is provided with a reflection sheet 110 covering the bottom surface 72 of the light guide plate 70, the LEDs 50, and the LED substrate 60. The light emitted from the LEDs 50 to the light guide plate 70 and light leaking from the bottom surface 72 of the light guide plate 70 to the rear surface (along arrow Y1) of the light guide plate 70 are reflected by the reflection sheet 110 to be effectively emitted from the surface 73 of the light guide plate 70. A lens sheet 120 and a diffusion sheet 130 are arranged sequentially along arrow Y1 on the surface (along arrow Y2) of the light guide plate 70.

As shown in FIG. 4, the light emitted from the plurality of LEDs 50 does not sufficiently overlap in a region of the light guide plate in the vicinity of the LEDs 50, and hence a difference between the amount of light in regions A1 each having a large amount of incident light, opposed to the LEDs 50 and the amount of light in regions A2 each having a small amount of incident light, opposed to positions between the adjacent LEDs 50 is increased. Therefore, in the region of the light guide plate 70 in the vicinity of the LEDs 50, relatively bright regions (regions A1 each having a large amount of incident light, opposed to the LEDs 50) and relatively dark regions (regions A2 each having a small amount of incident light, opposed to the positions between the adjacent LEDs 50) regularly emerge along an arrangement direction (direction X) of the LEDs 50. According to the first embodiment, the plurality of projecting portions 75 having irregularly different shapes and the flat portions 77 having the different widths are arranged on the light-receiving surface 71 of the light guide plate 70 along the direction X, as shown in FIG. 5, and hence light entering the regions A1 and light entering the regions A2 are dispersed in the direction X. Consequently, a difference in brightness between the regions A1 and the regions A2 is reduced.

The liquid crystal cell 90 is fixed on the side of the mold frame 80 along arrow Y2, as shown in FIG. 2. An antireflective sheet 140 is arranged on the side of a surface (along arrow Y2) of the liquid crystal cell 90.

According to the first embodiment, as hereinabove described, the plurality of projecting portions 75 each having the width smaller than the width W of each of the LEDs 50 in the extensional direction X of the light-receiving surface 71 are formed on the light-receiving surface 71 of the light guide plate 70 while the plurality of projecting portions 75 of the light guide plate 70 are formed in the isosceles triangular shapes having the apex portions 76 with the common angles θ and the irregularly different sizes, whereby the light directly incident on the plurality of projecting portions 75 can be irregularly refracted to be spread in the light guide plate 70. Thus, formation of bright and dark regions in the light guide plate 70 can be suppressed while unevenness of the amount of light emitted from the light guide plate 70 can be suppressed, and hence a reduction in display quality can be suppressed.

According to the first embodiment, as hereinabove described, the light-receiving surface 71 is formed to refract the light incident on the light-receiving surface 71 at the different angles depending on the incident positions of the light on the light-receiving surface 71 (the projecting portions 75 and the flat portions 77), whereby the light can be refracted at the different angles depending on the positions of the light-receiving surface 71 on which the light is incident. Thus, the light can be irregularly spread in the light guide plate 70, formation of bright and dark regions in the light guide plate 70 can be effectively suppressed, and a reduction in display quality can be suppressed.

According to the first embodiment, as hereinabove described, the plurality of projecting portions 75 provided on the light-receiving surface 71 are formed to have the irregularly different projecting heights, whereby the sizes of the projecting portions 75 are irregular so that the light emitted from the LEDs 50 toward the light-receiving surface 71 can be incident through the surfaces of the projecting portions 75 of the light guide plate 70 having the irregular sizes. Thus, the light can easily reach the regions A2 that the light in the light guide plate 70 hardly reaches, opposed to the positions between the adjacent LEDs 50, and hence formation of bright and dark regions in the light guide plate 70 can be effectively suppressed.

According to the first embodiment, as hereinabove described, the plurality of projecting portions 75 provided on the light-receiving surface 71 are formed to have the irregularly different widths, whereby the sizes of the projecting portions 75 are irregular so that the light emitted from the LEDs 50 toward the light-receiving surface 71 can be incident through the surfaces of the projecting portions 75 of the light guide plate 70 having the irregular sizes. Thus, the light can easily reach the regions A2 that the light in the light guide plate 70 hardly reaches, opposed to the positions between the adjacent LEDs 50, and hence formation of bright and dark regions in the light guide plate 70 can be effectively suppressed.

According to the first embodiment, as hereinabove described, each of the projecting heights of the plurality of projecting portions 75 is smaller than the width W of each of the LEDs 50 in the extensional direction of the side of the light guide plate 70 provided with the light-receiving surface 71, whereby a distance between the light guide plate 70 and the LEDs 50 can be reduced. Thus, an increase in the size of the liquid crystal television set 300 can be suppressed while unevenness of the amount of light emitted from the light guide plate 70 can be suppressed.

According to the first embodiment, as hereinabove described, the flat portions 77 substantially parallel to the LEDs 50 opposed to the light guide plate 70 are provided on the light guide plate 70 while the first surface 175 and the second surface 275 extending in the thickness direction of the light guide plate 70 are provided on each of the plurality of projecting portions 75, and the first surface 175 and the second surface 275 are inclined in the directions opposite to each other with respect to the flat portions 77. Thus, the first surface 175 and the second surface 275 can refract the light in the directions opposite to each other, and hence the light can be effectively dispersed.

According to the first embodiment, as hereinabove described, the plurality of projecting portions 75 are so formed that the apex portions 76 have substantially the same angles, whereby the structure of the plurality of projecting portions 75 can be inhibited from complication while the light can be refracted at the different angles.

According to the first embodiment, as hereinabove described, the plurality of projecting portions 75 are provided over the substantially entire region of the light-receiving surface 71 in the extensional direction of the side of the light guide plate 70 provided with the light-receiving surface 71, whereby unevenness of the amount of light emitted from the light guide plate 70 over an entire region of the light guide plate 70 in the extensional direction of the side of the light guide plate 70 provided with the light-receiving surface 71 can be suppressed.

According to the first embodiment, as hereinabove described, a plurality of flat portions 77 are formed between the plurality of projecting portions 75 of the light guide plate 70. Thus, the amount of light going straight in the light guide plate 70 from the flat portions 77 can be irregularized when part of light incident on the plurality of flat portions 77 goes straight toward a surface of the light guide plate 70 opposite to the light-receiving surface 71 in the light guide plate 70, and hence the light can be more effectively spread irregularly in the light guide plate 70. Consequently, unevenness of the amount of light emitted from the light guide plate 70 can be further suppressed.

According to the first embodiment, as hereinabove described, the plurality of projecting portions 75 each are formed to have the width larger than the width of each of the plurality of flat portions 77 in the extensional direction of the side of the light guide plate 70 provided with the light-receiving surface 71, whereby the plurality of projecting portions 75 can be provided in a wider range. Thus, the light can be effectively spread evenly over the entire region of the light guide plate 70 in the extensional direction of the side of the light guide plate 70 provided with the light-receiving surface 71.

According to the first embodiment, as hereinabove described, the flat portions 77 are provided on all positions between the adjacent projecting portions 75, whereby the flat portions 77 and the projecting portions 75 can be alternately provided along the side of the light guide plate 70 provided with the light-receiving surface 71. Thus, the light can be more evenly spread over the entire region of the light guide plate 70 in the extensional direction of the side of the light guide plate 70 provided with the light-receiving surface 71.

According to the first embodiment, as hereinabove described, the plurality of projecting portions 75 each are formed to have the width not more than ⅓ of the width of each of the LEDs 50 in the extensional direction of the side of the light guide plate 70 provided with the light-receiving surface 71, whereby the incident light can be easily spread irregularly in the light guide plate 70 by the more numerous projecting portions 75 having the irregular shapes. Thus, formation of bright and dark regions in the light guide plate 70 can be effectively suppressed.

Second Embodiment

The structure of a liquid crystal television set 300A (see FIG. 1) according to a second embodiment of the present invention is now described with reference to FIGS. 1 and 6. The liquid crystal television set 300A is an example of the "display" or the "television set" in the present invention.

In this second embodiment, a plurality of projecting portions 75a having tapered shapes are so formed that the angles ($\theta 1$ to $\theta 7$) of apex portions 76a thereof are irregularly different, dissimilarly to the first embodiment in which the plurality of projecting portions 75 are so formed that the angles $\theta$ of the apex portions 76 thereof are common while the sizes thereof are irregularly different.

Figure 6:
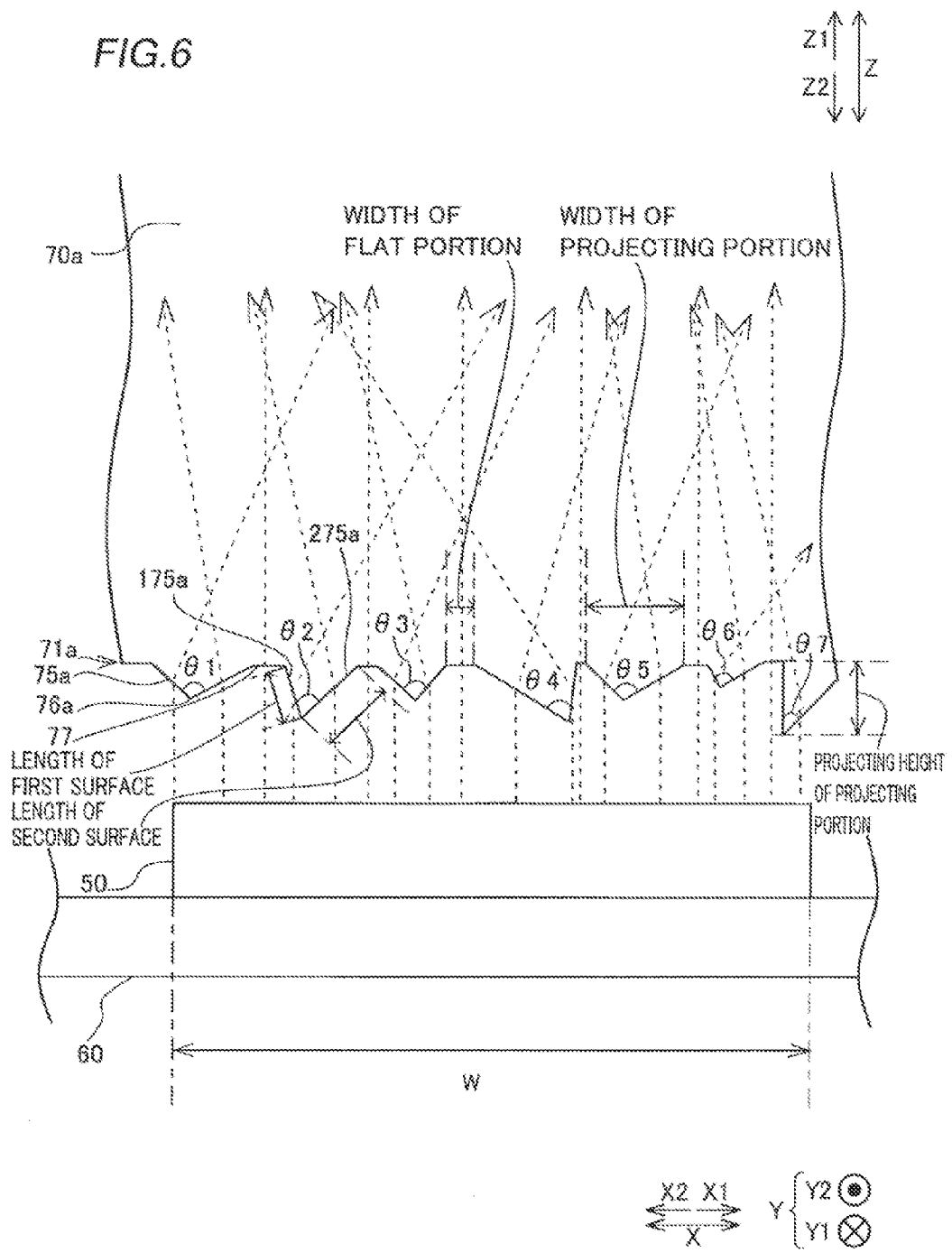
FIG. 6 is a front elevational view showing a path of light refracted in a region, in the vicinity of a light-receiving surface, of a light guide plate of a liquid crystal television set according to a second embodiment of the present invention.

As shown in FIG. 6, the plurality of projecting portions 75a formed on a light guide plate 70a of the liquid crystal television set 300A according to the second embodiment are so formed that the apex portions 76a have the irregularly different angles ($\theta 1$ to $\theta 7$). The lengths of first surfaces 175a and second surfaces 275a of the plurality of projecting portions 75a are irregular (different) as viewed along arrow Y1. In other words, the plurality of projecting portions 75a have irregularly different triangular shapes.

The first surfaces 175a and the second surfaces 275a of the plurality of projecting portions 75a are inclined with respect to a direction Z. Consequently, light emitted from LEDs 50 toward the plurality of projecting portions 75a is refracted at different angles depending on the incident positions of the light on the projecting portions 75a, and travels inside the light guide plate 70a in directions different with respect to a direction along arrow Z1.

In this second embodiment, the apex portions 76a of the plurality of projecting portions 75a have the irregularly different angles, and hence light entering relatively bright regions A1 in the light guide plate 70a and light entering relatively dark regions A2 in the light guide plate 70a are further dispersed in a direction X as compared with the aforementioned first embodiment in which the angles $\theta$ of the apex portions 76 are common. Consequently, a difference in brightness between the regions A1 and the regions A2 is further reduced.

The remaining structure of the second embodiment is similar to that of the aforementioned first embodiment.

According to the second embodiment, as hereinabove described, the plurality of projecting portions 75a are formed in the tapered shapes having the apex portions 76a with the irregularly different angles, whereby the light can be refracted at the different angles on the projecting portions 75a on which the light is incident. Thus, the incident light can be easily refracted at the different angles depending on the incident positions of the light on the projecting portions 75a.

The remaining effects of the second embodiment are similar to those of the aforementioned first embodiment.

Third Embodiment

The structure of a liquid crystal television set 300B (see FIG. 1) according to a third embodiment of the present invention is now described with reference to FIGS. 1 and 7. The liquid crystal television set 300B is an example of the "display" or the "television set" in the present invention.

In this third embodiment, a plurality of projecting portions 75b are formed in arcuate shapes having irregularly different heights, dissimilarly to the first embodiment in which the plurality of projecting portions 75 are formed in the triangular shapes having the apex portions 76 with the common angles $\theta$ and the irregularly different sizes.

Figure 7:
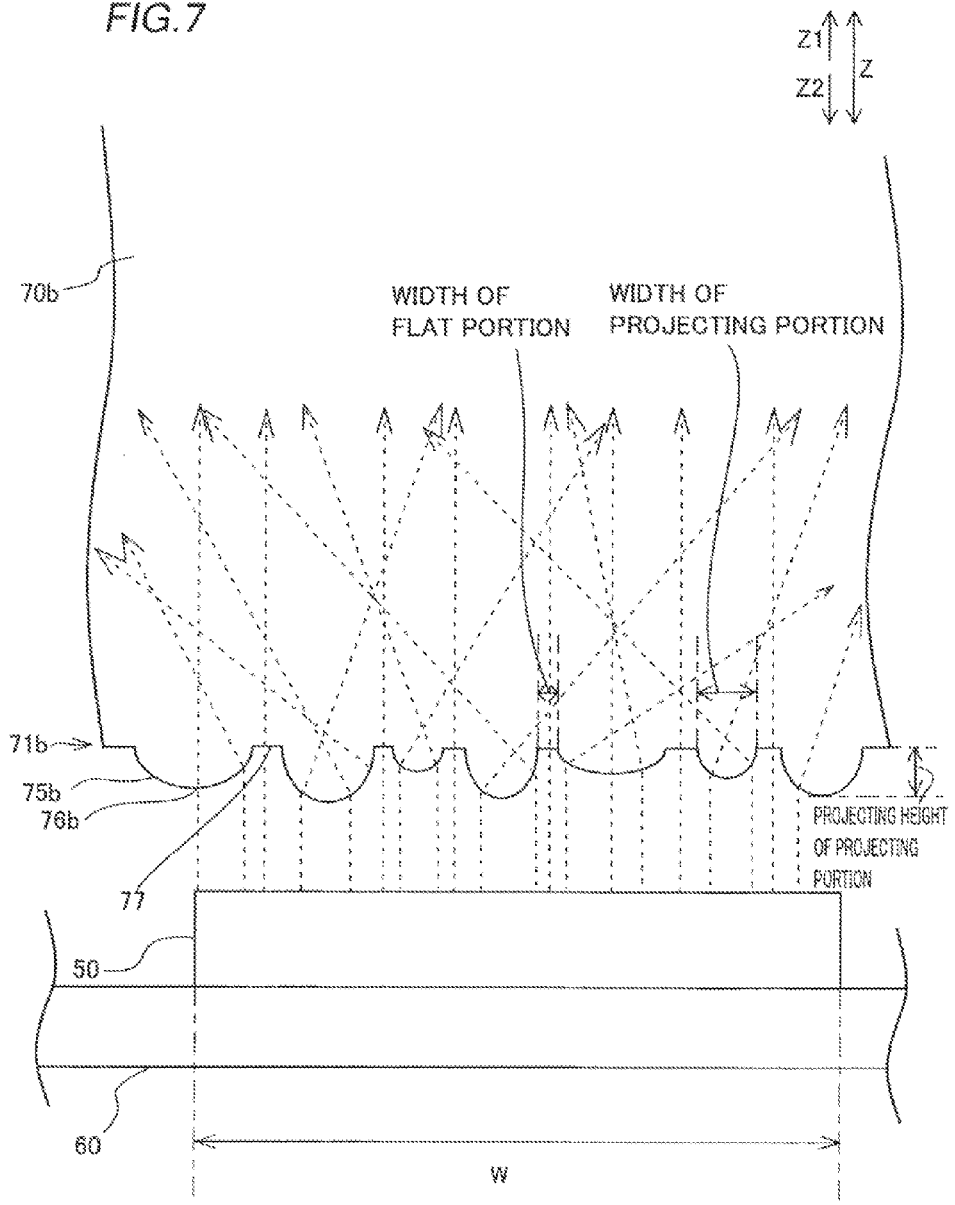
FIG. 7 is a front elevational view showing a path of light refracted in a region, in the vicinity of a light-receiving surface, of a light guide plate of a liquid crystal television set according to a third embodiment of the present invention.

As shown in FIG. 7, the plurality of projecting portions 75b of the liquid crystal television set 300B according to the third embodiment are formed integrally with a light guide plate 70b in the substantially arcuate shapes. The plurality of projecting portions 75b formed on the light guide plate 70b have different projecting heights toward LEDs. In other words, the sizes of the plurality of projecting portions 75b are irregularly different. The plurality of projecting portions 75b in the substantially arcuate shapes each have an arcuate shape including part of a circular shape or an arcuate shape including part of an elliptical shape.

The plurality of projecting portions 75b in the arcuate shapes are so formed that the angles thereof with respect to a direction along arrow Z1 (travelling direction of light from the LEDs 50 toward a light-receiving surface 71b) continuously change. Consequently, the light emitted from the LEDs 50 toward the projecting portions 75b is refracted at different angles depending on the positions of the projecting portions 75b on which the light is incident, and hence the light travels in different directions with respect to the direction along arrow Z1 inside the light guide plate 70b.

The remaining structure of the third embodiment is similar to that of the aforementioned first embodiment.

According to the third embodiment, as hereinabove described, the projecting portions 75b are formed in the irregularly different arcuate shapes, whereby the light can be irregularly refracted at the different angles on an entire region of the projecting portions 75b in the arcuate shapes having apex portions 76b with irregularly different projecting heights. Thus, the incident light can be easily refracted at the different angles depending on the incident positions of the light on the projecting portions 75b while the light can be effectively spread irregularly in the light guide plate.

The remaining effects of the third embodiment are similar to those of the aforementioned first embodiment.

Fourth Embodiment

The structure of a liquid crystal television set 300C (see FIG. 1) according to a fourth embodiment of the present invention is now described with reference to FIGS. 1 and 8. The liquid crystal television set 300C is an example of the "display" or the "television set" in the present invention.

In this fourth embodiment, a plurality of projecting portions 75c are formed to have surfaces in irregularly changing curved shapes, dissimilarly to the first embodiment in which the plurality of projecting portions 75 are formed in the triangular shapes having the apex portions 76 with the common angles θ and the irregularly different sizes.

Figure 8:
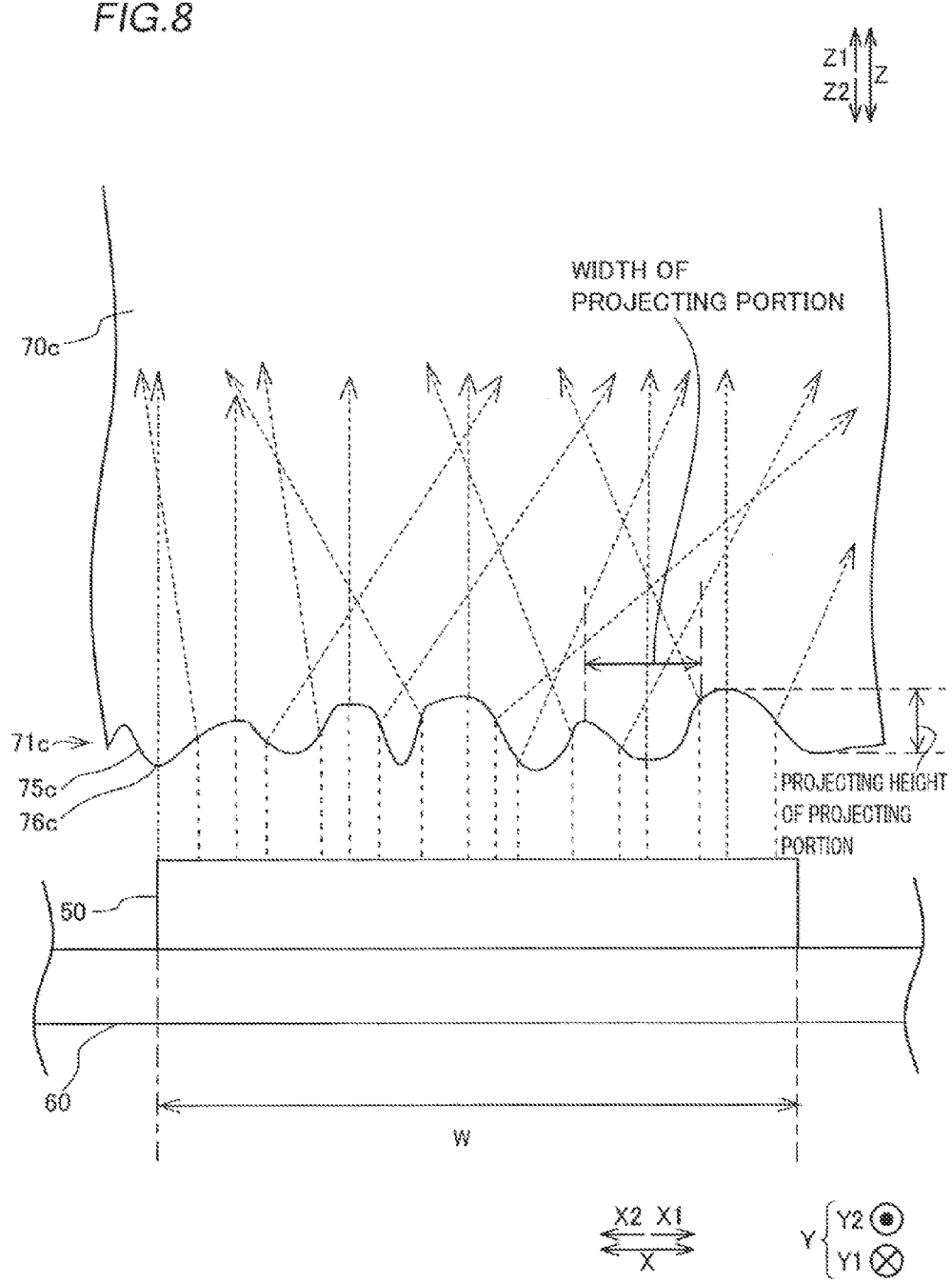
FIG. 8 is a front elevational view showing a path of light refracted in a region, in the vicinity of a light-receiving surface, of a light guide plate of a liquid crystal television set according to a fourth embodiment of the present invention.

As shown in FIG. 8, the plurality of projecting portions 75c of the liquid crystal television set 300C according to the fourth embodiment are integrally formed on a light guide plate 70c to have the surfaces (cross-sections) in the irregularly changing curved shapes.

Thus, the plurality of projecting portions 75c are so formed that the angles thereof with respect to a direction along arrow Z1 continuously and irregularly change. The plurality of projecting portions 75c irregularly project toward LEDs 50 to have different heights. Consequently, light emitted from the LEDs 50 toward the projecting portions 75c is refracted at different angles depending on positions of the projecting portions 75c on which the light is incident. The light refracted by the projecting portions 75c travels in different directions with respect to the direction along arrow Z1 inside the light guide plate 70c.

Thus, light entering relatively bright regions A1 of the light guide plate 70c in the vicinity of the LEDs 50 and light entering relatively dark regions A2 of the light guide plate 70c in the vicinity of the LEDs 50 can be effectively dispersed in a direction X. Consequently, a difference in brightness between the regions A1 and the regions A2 is further reduced.

The remaining structure of the fourth embodiment is similar to that of the aforementioned first embodiment.

According to the fourth embodiment, as hereinabove described, the plurality of projecting portions 75c are formed to have the surfaces in the irregularly changing curved shapes, whereby the incident light can be easily refracted at the different angles depending on the incident positions of the light on the projecting portions 75c simply by forming a light-receiving surface 71c of the light guide plate 70c in the irregularly curved shapes.

The remaining effects of the fourth embodiment are similar to those of the aforementioned first embodiment.

Although the present invention has been described and illustrated in detail, it is clearly understood that the same is by way of illustration and example only and is not to be taken by way of limitation, the spirit and scope of the present invention being limited only by the terms of the appended claims.

While the present invention is applied to the liquid crystal television set in each of the aforementioned first to fourth embodiments, the present invention is not restricted to this. The present invention may alternatively be applied to a liquid crystal display, a television set, and a display other than the liquid crystal television set.

While the plurality of projecting portions are so formed that both the projecting heights and widths thereof are irregularly different in each of the aforementioned first to fourth embodiments, the present invention is not restricted to this. The plurality of projecting portions may alternatively be so formed that only the projecting heights thereof or only the widths thereof are irregularly different.

While the plurality of projecting portions are formed in the triangular shapes in each of the aforementioned first and second embodiments, the present invention is not restricted to this. The plurality of projecting portions may alternatively be formed in polygonal shapes.

While the plurality of projecting portions each have the arcuate shape including part of a circular shape or the arcuate shape including part of an elliptical shape in the aforementioned third embodiment, the present invention is not restricted to this. The plurality of projecting portions may alternatively be formed in the combination of arcuate shapes and polygonal shapes. The plurality of projecting portions may alternatively be formed only in arcuate shapes including part of circular shapes. The plurality of projecting portions may alternatively be formed only in arcuate shapes including part of elliptical shapes.

While the plurality of projecting portions are formed in the curved shapes in the aforementioned fourth embodiment, the present invention is not restricted to this. The plurality of projecting portions may alternatively be formed in the combination of the curved shapes and either arcuate shapes or polygonal shapes or the combination of the curved shapes and both the arcuate shapes and polygonal shapes.

While the flat portions are provided between the plurality of projecting portions in each of the aforementioned first to third embodiments, the present invention is not restricted to this. No flat portion may alternatively be provided between the plurality of projecting portions.

While the plurality of projecting portions each have the width not more than ⅕ of the width W of each of the LEDs in each of the aforementioned first to fourth embodiments, the present invention is not restricted to this. The plurality of projecting portions each may alternatively have a width more than ⅕ of the width of each of the LEDs.

While the plurality of projecting portions are formed on the light-receiving surface of the light guide plate in each of the aforementioned first to fourth embodiments, the present invention is not restricted to this. The plurality of projecting portions may alternatively be formed on end surfaces other than the light-receiving surface of the light guide plate in addition to the light-receiving surface of the light guide plate.

While the projecting portions are provided over the substantially entire region of the light-receiving surface of the light guide plate opposed to the LEDs in each of the aforementioned first to fourth embodiments, the present invention is not restricted to this. The projecting portions may alternatively be provided on part of the light-receiving surface of the light guide plate.

What is claimed is:

1. A display comprising:
   point light sources;
   a light guide plate including a light-receiving surface on which light emitted from said point light sources is directly incident, opposed to said point light sources; and
   a display cell provided on a surface of said light guide plate, wherein
   a plurality of projecting portions, each having a width smaller than a width of each of said point light sources in an extensional direction of a side of said light guide plate provided with said light-receiving surface, are provided on a region of said light-receiving surface of said light guide plate opposed to said point light sources,
   said plurality of projecting portions of said light guide plate are formed to have irregularly different shapes,
   said plurality of projecting portions include a first projecting portion and a second projecting portion whose width differs from a width of said first projecting portion in said extensional direction,
   said light guide plate includes a flat portion substantially parallel to said point light sources,
   said flat portion includes a first flat portion and a second flat portion whose width differs from a width of said first flat portion in said extensional direction,
   said first flat portion is adjacent to said first projecting portion, and said second flat portion is adjacent to said second projecting portion,
   said width of said first projecting portion is larger than said width of said first flat portion,
   said width of said second projecting portion is larger than said width of said second flat portion, and
   said first projecting portion and said second projecting portion are formed to project toward said point light sources.

2. The display according to claim 1, wherein
   said light-receiving surface provided with said plurality of projecting portions having said irregularly different shapes is so formed that said light incident on said light-receiving surface is refracted at different angles depending on incident positions of said light on said light-receiving surface.

3. The display according to claim 2, wherein
   said plurality of projecting portions are formed to have irregularly different projecting heights.

4. The display according to claim 2, wherein
   said plurality of projecting portions are formed to have irregularly different widths.

5. The display according to claim 1, wherein
   a projecting height of each of said plurality of projecting portions is smaller than said width of each of said point light sources in said extensional direction.

6. The display according to claim 2, wherein
   said plurality of projecting portions are formed in tapered shapes having apex portions with irregularly different angles.

7. The display according to claim 2, wherein
   said plurality of projecting portions are formed in arcuate shapes having apex portions with irregularly different projecting heights.

8. The display according to claim 2, wherein
   said plurality of projecting portions are formed to have surfaces in irregularly changing curved shapes.

9. The display according to claim 6, wherein
   each of said plurality of projecting portions includes a first inclined surface and a second inclined surface both extending in a thickness direction of said light guide plate, and
   said first inclined surface and said second inclined surface are inclined in directions opposite to each other with respect to said flat portion.

10. The display according to claim 6, wherein
    said plurality of projecting portions are so formed that said apex portions have angles substantially equal to each other.

11. The display according to claim 2, wherein
    said plurality of projecting portions are provided over a substantially entire region of said light-receiving surface in said extensional direction.

12. The display according to claim 9, wherein
    said flat portion includes a plurality of flat portions having different lengths widths in a direction along said light-receiving surface, and
    said flat portions are provided between said plurality of projecting portions.

13. The display according to claim 12, wherein
    each of said plurality of projecting portions has a width larger than a width of each of said plurality of flat portions in said extensional direction.

14. The display according to claim 12, wherein
    said flat portions are provided on all positions between adjacent ones of said projecting portions.

15. The display according to claim 1, wherein
    each of said plurality of projecting portions has a width not more than ⅕ of said width of each of said point light sources in said extensional direction.

16. A television set comprising:
    point light sources;
    a light guide plate including a light-receiving surface on which light emitted from said point light sources is directly incident, opposed to said point light sources;
    a display cell provided on a surface of said light guide plate; and
    a receiving portion receiving television broadcasting, wherein
    a plurality of projecting portions, each having a width smaller than a width of each of said point light sources in an extensional direction of a side of said light guide plate provided with said light-receiving surface, are provided on a region of said light-receiving surface of said light guide plate opposed to said point light sources,
    said plurality of projecting portions of said light guide plate are formed to have irregularly different shapes,
    said plurality of projecting portions include a first projecting portion and a second projecting portion whose width differs from a width of said first projecting portion in said extensional direction,
    said light guide plate includes a flat portion substantially parallel to said point light sources,
    said flat portion includes a first flat portion and a second flat portion whose width differs from a width of said first flat portion in said extensional direction,
    said first flat portion is adjacent to said first projecting portion, and said second flat portion is adjacent to said second projecting portion,
    said width of said first projecting portion is larger than said width of said first flat portion,
    said width of said second projecting portion is larger than said width of said second flat portion, and said first projecting portion and said second projecting portion are formed to project toward said point light sources.

17. The television set according to claim 16, wherein said light-receiving surface provided with said plurality of projecting portions having said irregularly different shapes is so formed that said light incident on said light-receiving surface is refracted at different angles depending on incident positions of said light on said light-receiving surface.

18. The television set according to claim 17, wherein said plurality of projecting portions are formed to have irregularly different projecting heights.

19. The television set according to claim 17, wherein said plurality of projecting portions are formed to have irregularly different widths.

20. A display comprising:

light sources;

a light guide plate including a light-receiving surface on which light emitted from said light sources is directly incident, opposed to said light sources; and a display cell provided on a surface of said light guide plate, wherein a plurality of projecting portions, each having a width smaller than a width of each of said light sources in an extensional direction of a side of said light guide plate provided with said light-receiving surface, are provided on a region of said light-receiving surface of said light guide plate opposed to said light sources, said plurality of projecting portions of said light guide plate are formed to have irregularly different shapes, said plurality of projecting portions include a first projecting portion and a second projecting portion whose width differs from a width of said first projecting portion in said extensional direction, said light guide plate includes a flat portion substantially parallel to said light sources, said flat portion includes a first flat portion and a second flat portion whose width differs from a width of said first flat portion in said extensional direction, said first flat portion is adjacent to said first projecting portion, and said second flat portion is adjacent to said second projecting portion, said width of said first projecting portion is larger than said width of said first flat portion, said width of said second projecting portion is larger than said width of said second flat portion, and said first projecting portion and said second projecting portion are formed to project toward said light sources.

\* \* \* \* \*